Aug. 18, 1959  J. H. OTTENHEYM  2,900,310
REMOVING ω-AMINOCAPRONITRILE FROM CRUDE MIXTURES THEREOF
Filed Dec. 13, 1957
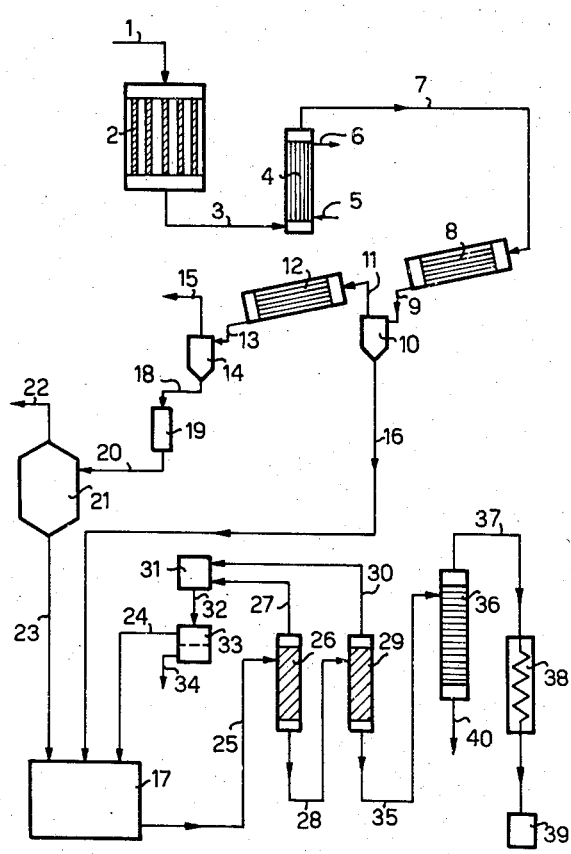
JOHANNES H. OTTENHEYM
BY: Cushman, Darby & Cushman
ATTORNEYS ൦United States Patent Office 2,900,310
Patented Aug. 18, 1959

2,900,310

REMOVING ω-AMINOCAPRONITRILE FROM CRUDE MIXTURES THEREOF

Johannes H. Ottenheym, Sittard, Netherlands, assignor to Stamicarbon N.V., Heerlen, Netherlands Application December 13, 1957, Serial No. 702,660

Claims priority, application Netherlands December 21, 1956

9 Claims. (Cl. 202—42)

This invention relates to the recovery of ω-aminocapronitrile from crude mixtures containing the same together with ω-caprolactam and water, such as are obtained, for example, as the reaction product when converting caprolactam to ω-aminocapronitrile with ammonia according to the reaction equation:

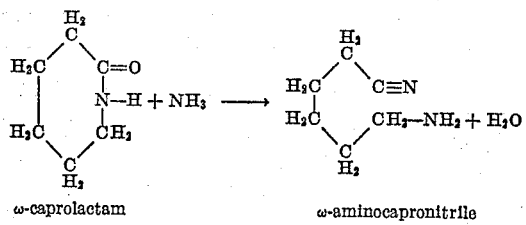

ω-caprolactam      ω-aminocapronitrile

Although the boiling points of ω-aminocapronitrile and ω-caprolactam (140° C. and 168° C., respectively at 35 mm. Hg) lie sufficiently far apart to make separation by distillation possible, it has been found that distillation of the crude mixture does not lead to the result desired. During the distillation high-boiling products are formed and the amount of aminocapronitrile obtained in this manner is smaller than the amount originally present in the mixture.

It has now been found that this drawback can be avoided when recovering ω-aminocapronitrile from crude mixtures containing the same together with ω-caprolactam and water by adding to the mixture an inert organic solvent which is capable of forming an azeotrope with water, evaporating at least part of the water from the mixture and subsequently recovering the ω-aminocapronitrile from the remaining part of the mixture by distillation.

In the practical operation of the present process, it is not essential to remove all the water from the crude mixture by way of evaporation together with the added solvent. A large proportion of the water in the crude mixture, i.e. up to about 75% by weight thereof, may be removed by evaporation before the solvent is added. Preferably, such preliminary evaporation is carried out in a continuously working film evaporator, in which the evaporation can be carried out sufficiently quickly to avoid the formation of high boiling products and after addition of an inert organic solvent the remaining water may be subsequently removed by evaporation together with the added solvent, for example by azeotropic distillation. When such a preliminary evaporation step is used, preferred conditions of temperature and pressure include 70 to 80° C. and 100 to 200 mm. pressure. These conditions make it possible to remove the water in a short enough period, e.g. less than one minute, without the formation of undesired products.

In the evaporation step, preferably substantially all of the water remaining in the mixture should be removed. However, under certain circumstances, it is not essential to effect complete removal of the water. Thus, the evaporation may be carried out in such a way that the amount of organic solvent is sufficient to remove only a part of the water present. According to this modification of the invention, all of the added organic solvent is removed together with volatile impurities and part of the water, leaving, for example, 0.5 to 2% by weight, of water, in the mixture. In order to avoid the formation of substantial amounts of high boiling byproducts, the subsequent distillation to recover ω-aminocapronitrile is preferably carried out in a continuously operating device in which any amounts of water and of solvent still present are removed immediately through the vacuum pump, and in which the ω-aminocapronitrile is not subjected to high temperatures (in excess of 150° C. over a long period of time.

In a preferred embodiment of the process the crude mixture of ω-aminocapronitrile with ω-caprolactam and water is subjected to the water removal treatment in vaporous form. According to this modification vapours of a mixture of ω-aminocapronitrile with ω-caprolactam and water are condensed by fractional condensation at least two stages so that in the final stage more water is condensed than in the previous stages of said fractional condensation. Subsequently from the condensate obtained in said final stage a large amount of the water, for example up to about 75% thereof is evaporated in a suitable evaporator, preferably under reduced pressure of about 50 to 80 mm. mercury pressure, under which conditions substantially no lactam is found to be present in the evaporated water. The concentrate obtained by this evaporation consists of a mixture crude ω-aminocapronitrile and ω-caprolactam still containing water, which concentrate is mixed with the fractions containing water, which are obtained in the said previous stages of the fractional condensation.

Subsequently an organic solvent, such as benzene, which is capable of forming an azeotrope with water, is added in an amount sufficient to remove by simultaneous evaporation only a part, usually 25 to 75% of the water still present, which part of the water is then removed by simultaneously evaporating the added solvent and water. This latter evaporation need not necessarily be an azeotropical distillation, but may be a simple simultaneous evaporation. The vapours obtained thereby are condensed to form a two layers-system, which layers are separated so that an aqueous phase and an organic phase are obtained separately. The aqueous phase obtained in this way mostly contains a small amount about 0.5 to 2% by weight, of lactam. In order to avoid losses of lactam the aqueous phase may be added to the condensate obtained as the final stage in the hereinbefore described fractional condensation of the crude vaporous mixture.

The organic phase separated from the said two layers system mainly consists of the added solvent together with impurities, from which the solvent may be recovered by rectification in order to have the same ready for rinse.

The residual amounts of water and eventually of the added solvent still present in the mixture of ω-aminonitrile and lactam after the evaporation treatment do not harm the subsequent continuous distillation of the mixture under reduced pressure of about 20 to 50 mm. mercury pressure, as the said residual amounts are removed by the vacuum producing device.

In a continuously operating distillation device the ω-aminocapronitrile may be obtained as the overhead product, whereas the ω-caprolactam is discharged as the bottom product.

Any inert organic solvent which forms an azeotrope with water is suitable for removing water according to the invention. Typically suitable solvents are benzene and the xylenes but other monocyclic hydrocarbons such as toluene, cyclopentane and cyclohexane, are also desirable.

The invention and its advantages are further illustrated, but not limited, by the following examples.

EXAMPLE 1

The desirable effect of removing water from the crude mixtures containing ω-aminocaprolactam is demonstrated by the following three experiments:

Experiment 1

A mixture of 100 g. ω-aminocapronitrile and 100 g. ω-caprolactam containing no water is distilled at decreased pressure. At 129–132° C. and 26 mm Hg, 98.5 g. of ω-aminocapronitrile are obtained, and at 158–161° C. and 26 mm. Hg, 97.5 g. of caprolactam, the amount of residue formed being 4 g.

Experiment 2

A mixture of 100 g. ω-aminocapronitrile, 100 g. ω-caprolactam and 20 g. water is distilled. Working at normal pressure 12 g. of water are distilled off at 100–103° C. As distillation is continued at a lower pressure, 8 g. of water are collected first, then (at 129–132° C. and 26 mm. Hg) 85 g. aminocapronitrile, and finally (at 158–161° C. and 26 mm. Hg), 84 g. of caprolactam, the amount of residue being 31 g.

Experiment 3

From a mixture of 100 g. ω-aminocapronitrile, 100 g. of ω-caprolactam and 20 g. of water, first 12 g. of water are removed in a film evaporator. Subsequently 100 g. of benzene are added to the mixture which still contains 8 g. of water after which the mixture is azeotropically distilled at normal pressure and a temperature of 69–70° C. to remove the rest of the water. The distillation is then continued at reduced pressure so that the rest of the benzene is first removed and then, at 129–132° C. and 26 mm. Hg, 98 g. of aminocapronitrile, and at 158–161° C. and the same pressure, 97 g. of caprolactam. The amount of residue is 5 g.

EXAMPLE 2

At a temperature of 340° C. the vapor of ω-caprolactam with ammonia in the ratio of 12 moles of ammonia per mole of lactam is continuously passed through a reaction tube (3 cm. diameter, 60 cm. long) filled with alumina tablets (3 mm. diameter, 2 mm. thick) at a space velocity of 3080 litres (calculated at 0° C. and 1 atm.) per litre of catalyst per hour. The reaction mixture issuing from the reaction tube is condensed and passed through a film evaporator for removing the major part of the reaction water.

The composition of the resulting mixture (in percent by weight) is: 44% lactam, 52.5% aminonitrile, 2.5% water and 1% of by-products.

To 1000 g. of this mixture 350 g. of benzene are added after which the water is removed by azeotropic distillation at 69–70° C.

Subsequently the mixture is continuously distilled at reduced pressure during which, after removal of the rest of the benzene, 516 g. of aminocapronitrile are collected at 135–144° C. (22–50 mm.). The bottom product yields 432 g. of caprolactam. The amount of residue is 27 g. The caprolactam thus obtained is reused as starting material.

EXAMPLE 3

In a continuous operation as illustrated schematically in the accompanying drawing ω-caprolactam is reacted with ammonia.

A mixture of vaporized lactam and ammonia (25 moles of ammonia per mole of lactam) is preheated to 310° C. and passed through pipe 1 into a tube reactor in which a number of tubes 2, filled up with alumina tablets, are arranged. The temperature in the reactor is maintained at 310° C.

The hot reaction gases discharged from the reactor through outlet tube 3 are passed through a heat exchanger (not shown) in which the temperature of the gases is decreased to 250° C. Subsequently the gases are passed through a cooler. In the cooler 4, the temperature of the gases is decreased to 150° C. by means of a cooling medium comprising water maintained under super-atmospheric pressure by means of nitrogen. The cooling medium is introduced through inlet 5 and is discharged through outlet 6.

The gas now having a temperature of 150° C. is passed through a condensation system in which a fractional condensation takes place. The gas is introduced through pipe 7 into a first condenser 8. A mixture of gas and liquid is passed through tube 9 into a separator 10 in which at a temperature of 70° C. the first condensate is separated from the gas. The gas discharged from the separator 10 is passed through tube 11 into a second condenser 12. The gas and liquid discharged from the second condenser 12 is passed through tube 13 into a separator 14 in which at a temperature of 30° C., the second condensate is separated from the gas. The cooling medium used in the condensers 8 and 12 is water.

The gas discharged from the separator 14 through pipe 15 still contains about 75% of the water and is subjected to further purification (not illustrated) for the recovery of ammonia therefrom.

The first condensate from separator 10 contains 45% lactam, 51% aminocapronitrile, 1.2% water, 0.8% dissolved ammonia and 2% byproducts (all percentages are by weight). This condensate is passed through pipe 16 into the mixing vessel 17.

The second condensate from separator 14 contains 7% lactam, 59% aminocapronitrile, 27% water, 6% dissolved ammonia and 1% byproducts (all percentages are by weight). From this second condensate, the greater part of the water is removed by passing the condensate through pipe 18, through a heater 19 and through pipe 20 into a thickener 21 in which at a temperature of 80° C. under reduced pressure water is evaporated and discharged through pipe 22. The concentrated product from thickener 21 is passed through pipe 23 into the mixing vessel 17.

In the mixing vessel 17, the liquids are mixed with benzene from pipe 24 and subsequently the mixture is passed through pipe 25 into the first evaporator 26, from which vapors containing benzene and water are discharged through pipe 27. The bottom product from the evaporator 26 is passed through pipe 28 into a second evaporator 29, from which the vapors are discharged into pipe 30. The evaporators 26 and 29 are operated under reduced pressure and by means of steam the temperature of the first evaporator 26 is maintained at 95–100° C. and of the second evaporator 29 at 130–135° C. Into the upper part of the evaporators 26 and 29 benzene from separator 33 is introduced for aiding the reflux (not indicated in the drawing).

The vapors from pipe 27 and pipe 30 are passed into a condenser 31 and the condensate is passed through pipe 32 into the separator 33 in which an aqueous liquid is separated from the benzene. The aqueous liquid is withdrawn through pipe 34 and recycled to the second condensate from separator 14. The benzene is passed, after rectification (not shown), through pipe 24 into the mixing vessel 17.

The bottom-liquid from evaporator 29 is passed through pipe 35 into a rectifying column 36 operating in vacuo in which at a temperature note exceeding 100° C. vapors of the aminocapronitrile are discharged overhead through pipe 37. The aminocapronitrile vapors are condensed in a cooler 38 and the final product is collected in tank 39.

The bottom-liquid from the rectifying column 36 is discharged through pipe 40 and passed to further purification in order to recover the unconverted caprolactam, which is used again.

The invention is operable with crude mixtures of ω-aminocapronitrile, ω-caprolactam and water of varying composition. Generally speaking, however, the process finds its greatest use in the treatment of mixtures containing from 40 to 75% ω-aminocapronitrile, 55 to 15%

ω-caprolactam and 5 to 10% water, percentages being by weight.

Having thus described the invention, what is claimed as new is:

1. A process for recovering ω-aminocapronitrile from crude mixtures thereof with ω-caprolactam and water which comprises adding to said mixture, an inert organic solvent which forms an azeotrope with water, evaporating at least part of the water in said mixture together with said solvent and thereafter distilling the ω-aminocapronitrile from the remainder of said mixture.

2. The process of claim 1 wherein up to about 75% of the water in the crude starting mixture is removed by rapid evaporation prior to adding said inert organic solvent.

3. The process of claim 2 wherein substantially all of the remaining water is evaporated as an azeotrope with said solvent.

4. The process of claim 2 wherein any water remaining in said mixture after the evaporation of the said solvent is vaporized during continuous distillation of the ω-aminocarprolactam from said mixture.

5. The process of claim 2 wherein all of the remaining water is continuously evaporated as an azeotrope with said solvent and the ω-aminocapronitrile is subsequently recovered by continuous distillation.

6. A process for recovering ω-aminocapronitrile from crude mixtures thereof with ω-caprolactam and water, which comprises removing substantially all of the water in said crude mixture, at least part of said water being removed as an azeotrope with an inert organic solvent, and thereafter distilling the substantially water-free mixture to recover the ω-aminocapronitrile therefrom.

7. The process of claim 6 wherein said solvent is a monocyclic hydrocarbon.

8. A process for recovering ω-aminocapronitrile from crude mixtures thereof with ω-caprolactam and water, which comprises subjecting the vaporous crude mixture to fractional condensation in at least two stages, so that in the final stage more water is condensed than in each of the previous stages of said condensation, evaporating not more than 75% of the water from the condensate obtained in said final stage to obtain a concentrate, mixing the said concentrate with the condensed product containing water obtained in a previous stage of said condensation and with an added organic solvent, capable of forming an azeotrope with water, the amount of the added solvent being sufficient to remove by simultaneous evaporation 25 to 75% of the water still present, evaporating the added solvent simultaneously with 25 to 75% of the water present, and separating the vapours from the residual liquid, condensing the vapors obtained to form a two layer system and separating the layers of said system to obtain separately an aqueous phase and an organic phase, recycling the said aqueous phase to the final stage of the said fractional condensation, recovering said added solvent from said organic phase, and subjecting the said residual liquid to continuous distillation under reduced pressure so as to obtain ω-aminocapronitrile as an overhead distillate and retaining ω-caprolactam as a bottom product.

9. The process of claim 2 wherein said rapid evaporation is carried out at 70° to 80° C. and 100 to 200 mm. pressure; and the solvent is benzene.

References Cited in the file of this patent

UNITED STATES PATENTS

| 2,234,566 | Lazier | Nov. 11, 1941 |
| 2,405,969 | Martin | Aug. 20, 1946 |
| 2,745,882 | Hale | May 15, 1956 |

FOREIGN PATENTS

| 534,939 | Great Britain | Mar. 24, 1941 |